UNITED STATES PATENT OFFICE.

MICHAEL J. A. KEANE, OF NEW YORK, N. Y.

IMPROVEMENT IN COMPOUNDS FOR PLATING AND POLISHING.

Specification forming part of Letters Patent No. 111,945, dated February 21, 1871.

*To all whom it may concern:*

Be it known that I, MICHAEL J. A. KEANE, of the city of New York, in the county and State of New York, have invented a new and Improved Plating and Polishing Compound; and I do hereby declare the following is a full, clear, and exact description thereof, which will enable others skilled in the art to make and use the same.

This invention relates to a new compound for plating or polishing articles of soft metals, such as spoons, forks, and the like, and consists in a compound made of silver, chemically pure, or chloride of gold, cyanide potassium, and prepared chalk, or any coloring substance of a similar nature, to hold the other ingredients in a semi-fluid state.

This compound I apply with a brush or a buffer of soft substance, as cloth, chamois-skin, or the like, and find it to be a very effective and useful compound for the purpose. I may also use other metals with the potassium in like manner.

Having thus described my invention, I claim as new and desire to secure by Letters Patent—

Pure silver, chloride of gold, cyanide of potassium and prepared chalk, combined in the proportions and applied as and for the purpose specified.

MICHAEL J. A. KEANE.

Witnesses:
GEO. W. MABEE,
ALEX. F. ROBERTS.